Jan. 8, 1963 H. R. BURKER 3,071,787
INFLATABLE FLOAT DEVICE FOR SINKABLE OBJECTS
Filed Dec. 15, 1959 2 Sheets-Sheet 1
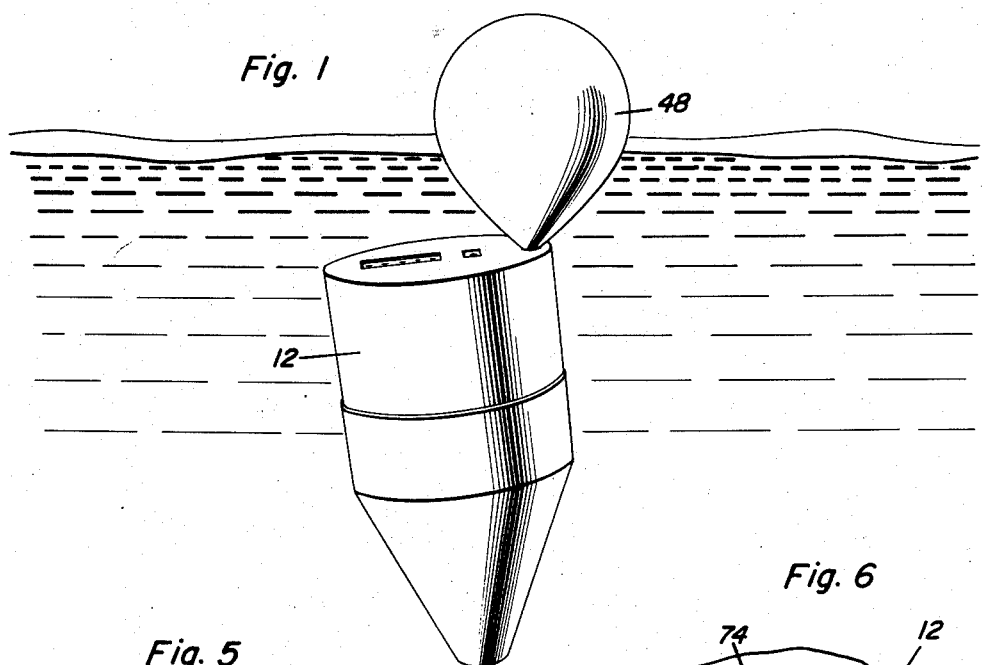
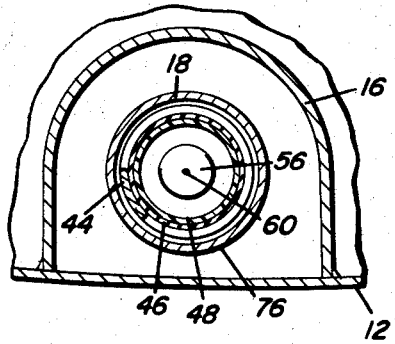
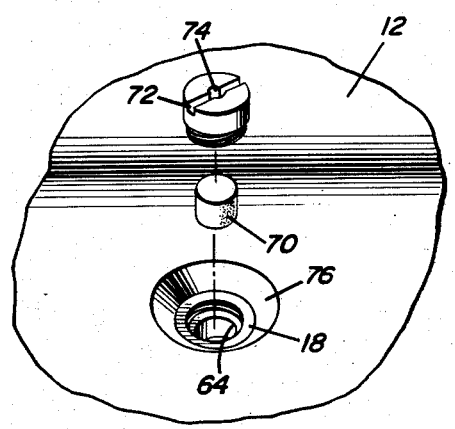
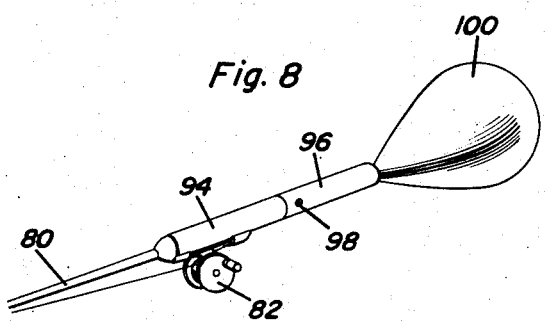
Henry R. Burker
INVENTOR.

Jan. 8, 1963 H. R. BURKER 3,071,787
INFLATABLE FLOAT DEVICE FOR SINKABLE OBJECTS
Filed Dec. 15, 1959 2 Sheets-Sheet 2
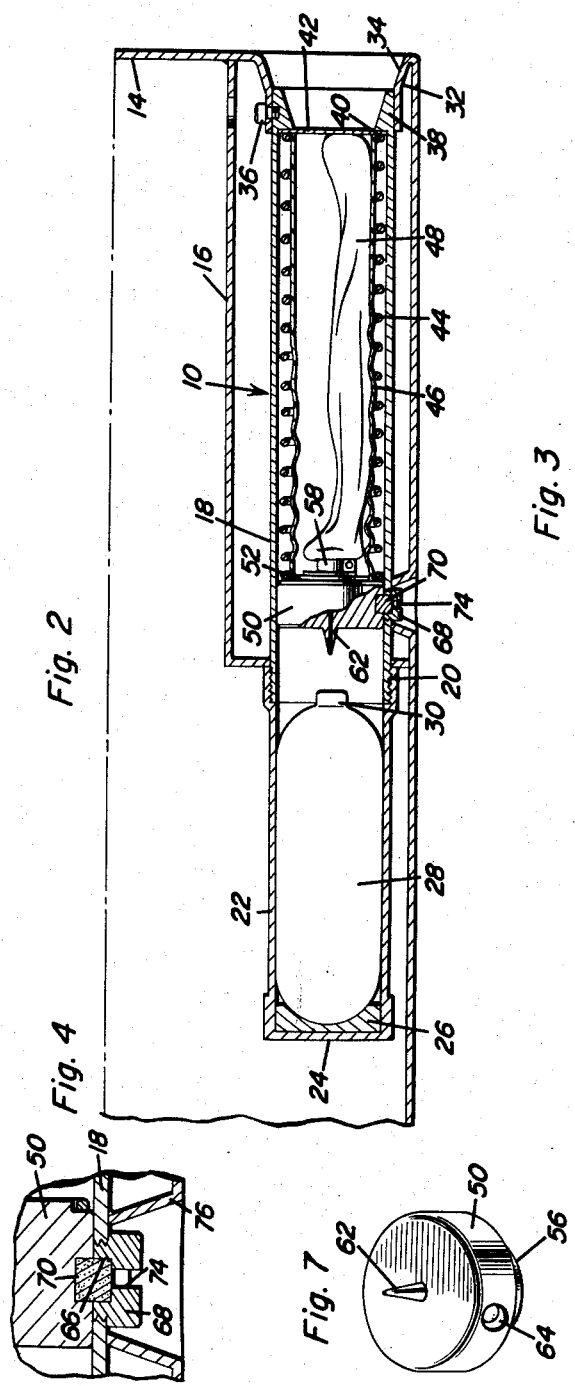
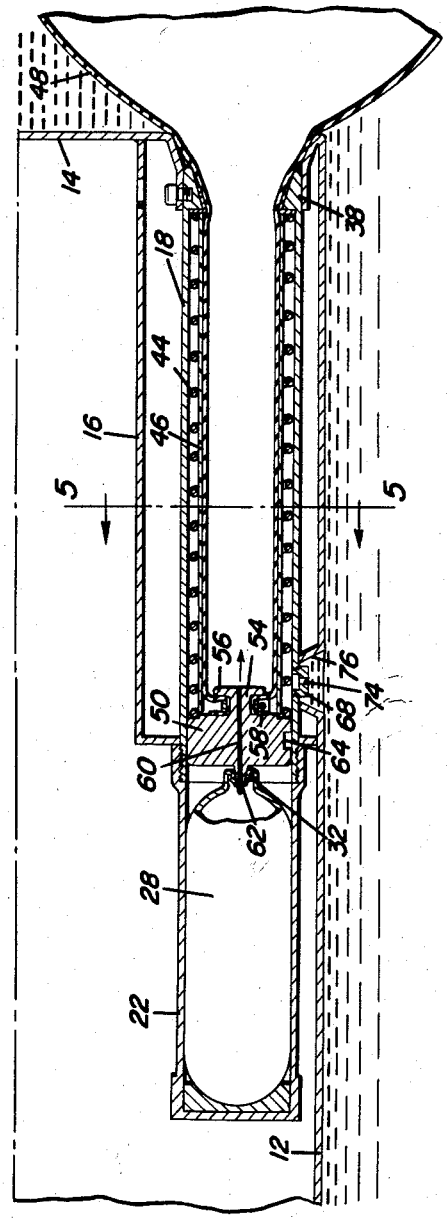
Henry R. Burker
INVENTOR.

_United States Patent Office_

3,071,787
Patented Jan. 8, 1963

3,071,787
INFLATABLE FLOAT DEVICE FOR SINKABLE OBJECTS
Henry R. Burker, 1111 Virginia Ave., Hagerstown, Md.
Filed Dec. 15, 1959, Ser. No. 859,673
5 Claims. (Cl. 9—8)

The present invention generally relates to a float construction and more particularly to an inflatable float device for attachment to or incorporation into an object having a greater specific gravity than water, the device being inflated in response to sinking of such an object in water thereby causing such an object to be floated to the surface of the water for ease of retrieving the object.

The primary object of the present invention is to provide an inflatable float device for sinkable objects incorporating a mechanism normally rendered inoperative but which is rendered operative in response to submersion in water whereby the inflatable float device will cause the object to be floated to the surface of the water.

There are many instances of objects sinking into the water which cannot be retrieved at a reasonable cost or for other reasons. For example, much fishing and boating equipment is lost due to accidental sinking of such equipment. Examples of such an equipment are fishing rods and reels, outboard motors, fish tackle boxes and creels, bait boxes and the like. A more recent problem of this nature has faced persons engaged in space flight when attempting to recover the pay load or nose cone of a rocket or the like since these are quite often directed to fall into deep water. Diving equipment can be used for retrieving such articles in certain instances, diving equipment is usually not available and requires someone experienced in diving procedure to retrieve such articles, especially in deep water. Therefore, it is one of the major objects of the present invention to provide a float device that may be attached to or incorporated into sinkable objects for purposes of floating such objects back to the surface of the water, the float device being quite simple in construction, fool-proof, easy to attach or incorporate into an object, effective for its particular purposes and extremely inexpensive to manufacture thereby rendering the device economically feasible.

Another object of the present invention is to provide an inflatable float device in accordance with the preceding objects including in its construction a replaceable cartridge of compressed gaseous material for facilitating re-use of the float device by replacing the cartridge together with a water soluble element which retains a spring-loaded puncture device in retracted position for release thereof when water dissolves the water soluble element.

A further object of the present invention is to provide an inflatable float device in accordance with the preceding objects in which the puncture device is provided with a passage and attached to an inflatable balloon for inflating the balloon when the compressed gases are released thereinto with the balloon normally being received in a housing and being discharged for inflation exteriorly of the housing upon puncturing of the compressed gas cartridge.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the float device of the present invention in use on a sinkable object such as the nose cone of a rocket or the like;

FIGURE 2 is a longitudinal, sectional view of the inflatable float device of the present invention illustrating the device in a set condition prior to inflation;

FIGURE 3 is a sectional view similar to FIGURE 2 but with the float being inflated;

FIGURE 4 is a detail sectional view illustrating the water soluble element and its relationship to the movable plunger for retaining it in retracted position;

FIGURE 5 is a transverse, sectional view taken substantially upon a plane passing along section line 5—5 of FIGURE 3 illustrating the structural details of the float device;

FIGURE 6 is an exploded group perspective view illustrating the removable apertured retainer cap for the water soluble element or pill;

FIGURE 7 is a perspective view of the slidable plunger with the puncture device incorporated therein; and FIGURE 8 is a schematic perspective view illustrating the float device with the present invention incorporated into the handle of a fishing rod and reel.

Referring now specifically to the drawings, the float device of the present invention has been illustrated as being incorporated into a nose cone of a missile in FIGURES 1-7 and as being incorporated into the handle of a fishing rod in FIGURE 8 and it is pointed out that the device may be incorporated with various equipment subject to sinking in water such as in outboard motors, fish tackle boxes, bait boxes and any of the equipment of this nature.

The float device of the present invention is generally designated by the numeral 10 and it is incorporated into an enlarged receptacle 12 forming a nose cone for a missile or the like with the float device communicating with one exterior wall of the receptacle 12 such as the end wall 14 and being disposed adjacent the peripheral surface of the wall 12 so that it will not occupy too much of the interior area of the missile cone so that various instruments may be carried therein. The receptacle 12 is provided with a partition wall 16 forming generally a retainer for a cylindrical casing 18 forming a part of the float device 10. The cylindrical casing 18 is screw-threaded at the inner end as designated by numeral 20 which screw-threadedly receives a housing or casing extension 22 which is cylindrical in construction and provided with a closed end 24 and a seat 26 therein receiving the rounded base end of a compressed gas cartridge 28 which has a reduced neck 30 provided with a rupturable seat 32 in one end thereof which faces the cylindrical casing 18 and is disposed adjacent the threaded end 20 of the casing 18.

The other end of the casing 18 is received in and secured to an inturned flange 32 forming an opening 34 in the end wall 14 with the flange 32 being secured to the casing 18 by the screw-threaded fastener 36 or the like. The end of the casing 18 attached to the flange 32 is thickened as indicated by numeral 38 thereby defining a shoulder 40 for receiving a retaining plate 42 which normally closes the casing 18 but which is sufficiently flexible to be forced out of the opening 34 and out of the end of the casing 18 upon inflation of the float device in a manner described hereinafter.

Disposed within the casing 18 is an elongated coil compression spring 44 disposed adjacent the inner surface of the casing 18 with a plastic case or lining 46 of cylindrical construction being disposed against the interior surface of the coil spring 44 thereby providing a protector to an inflatable balloon-like member 48 which has the outer closed end normally disposed against or adjacent the closure plate 42 and the mouth end thereof disposed adjacent the inner end of the spring 44.

Slidably disposed within the casing 18 adjacent the threaded end 20 is a cylindrical plunger or piston 50 having a shoulder 52 on one end receiving the inner end of the spring 44. Extending centrally from the shoulder end of the plunger 50 is a reduced cylindrical neck 54 terminating in an outwardly extending flange 56 over which the mouth of the balloon 48 is disposed. A clamp 58 encircles the mouth of the balloon between the flange 56 and the main body of the plunger 50 and encircling relation to the neck 54 for securely clamping the mouth of the balloon 48 to the neck 54 and flange 56.

The plunger or piston 50 is also provided with a longitudinal passageway 60 extending therethrough which communicates with the inner end of the flange 56 and also extends to the tip end of a pointed puncture member 62 which is aligned with the rupturable seal 32 for puncturing the rupturable seal 32 thus communicating the interior of the cartridge 28 with the interior of the balloon 48 through the passageway 60 when the plunger 50 has been moved longitudinally by the spring 44 into puncturing engagement with the rupturable seal 32.

The plunger 50 is provided with a socket or recess 64 extending radially inwardly from the periphery thereof for alignment with a socket 66 in a setscrew 68 threaded into the casing 18 with the inner end thereof being flush with the casing 18 so that it will not project interiorly of the casing 18 and interfere with the sliding movement of the plunger 50. A water soluble member 70 which may be considered a water soluble pill is disposed partially within recess 66 and partially within the recess 64 thereby forming a lock or key for retaining the plunger 50 in retracted position as illustrated in FIGURE 2. The setscrew 68 is provided with a transverse slot 72 for receiving the suitable turning instrument such as a screwdriver or the like and is also provided with an opening 74 which communicates the outer end of the setscrew 68 with the water soluble element 70 so that water may have access to the water soluble element 70 when submerged in the water as illustrated in FIGURE 3. Of course, an indentation such as indicated by numeral 76 is provided in the receptacle 12 for providing access to the setscrew 68 and otherwise providing a smooth surface for the receptacle 12.

With the device conditioned as illustrated in FIGURE 2, assume that the device is dropped into the water. Promptly upon this happening, the water will dissolve the water soluble element or pill 70 thus releasing the plunger 50. The compressed spring 44 will then slam the plunger 50 towards the cartridge 28 whereupon the puncture element 62 will puncture the rupturable seal 32. This will communicate the compressed gas with the interior of the balloon through the passageway 60 in an obvious manner thus causing the balloon to begin inflating. As the balloon inflates, it will come into contact with the plastic liner 46 which prevents abrasion of the balloon against the spring and ultimately the balloon will force the closure plate or disk 42 outwardly. This closure plate or disk may be constructed of rupturable or flexible material which may be in the form of a replaceable element or it may be secured to the casing in such a manner that it may be replaced when the balloon is deflated and once again placed within the cylindrical plastic liner 46. The inflation of the balloon 48 will be sufficient to raise the particular object to which it is attached to the surface of the water thereby enabling such an object to be easily retrieved.

When reconditioning the float device, it is only necessary to deflate the balloon and place it back in the condition shown in FIGURE 2, that is within the plastic liner. Also, it is necessary to remove the setscrew 68 and replace the water soluble element 70 in the setscrew and then into the recess 64 while retaining the plunger 50 in retracted position with the spring 44 partially compressed. Also, it is necessary to remove the extension or cap 22 and replace the cartridge 28 with an unspent cartridge.

FIGURE 8 illustrates the manner in which the present invention is incorporated into a fishing rod 80 having a reel 82 thereon and a handle 84 which is hollow with the housing 96 comparable to housing 18 forming a portion of the handle 94. The setscrew 98 is illustrated as is the inflated balloon 100 with the structure being substantially the same as that illustrated in FIGURES 1–7 except that it is associated with a fishing rod. Other structural arrangements may be provided for attachment to or incorporation into the outboard motors, fish tackle boxes and the like. The material from which the water soluble element 70 is constructed may be one of numerous materials that are completely soluble when placed in water and the spring 44 must be sufficiently strong to cause the puncture element 62 to fully penetrate the rupturable seal 32 in the cartridge 28.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An inflatable float device for a sinkable object comprising an elongated tubular casing, a cartridge of compressible gaseous material in one end of said casing, a sliding plunger mounted in said casing, said plunger including a pointed puncture member thereon for puncturing the cartridge, said plunger including passage means therein for communicating with the interior of the cartridge when puncturing the same, a balloon mounted on said plunger in communication with the passage for inflation of the balloon when the cartridge is punctured, spring means disposed in the casing in enclosing relation to the balloon when uninflated and engaging with the plunger for forcing the plunger towards the cartridge, and means for retaining the plunger in retracted position in spaced relation to the cartridge, said means including a water soluble element interconnecting the plunger and casing and being effective to release the plunger for movement thereof towards the cartridge under the influence of the spring means when the water soluble element is dissolved by water thereby inflating the balloon and causing it to move out of the casing for floating the casing and the object to which it is attached, said spring means being in the form of a coil spring disposed concentrically within said casing, a flexible liner disposed against the inner surface of the convolution of the spring with the balloon being disposed within the liner, a rupturable closure plate for the outer end of the casing whereby inflation of the balloon will rupture the closure plate for movement outwardly of the casing.

2. An inflatable float device for a sinkable object comprising an elongated tubular casing, a cartridge of compressible gaseous material in one end of said casing, a sliding plunger mounted in said casing, said plunger including a pointed puncture member thereon for puncturing the cartridge, said plunger including passage means therein for communicating with the interior of the cartridge when puncturing the same, a balloon mounted on said plunger in communication with the passage for inflation of the balloon when the cartridge is punctured, spring means disposed in the casing in enclosing relation to the balloon when uninflated and engaging with the plunger for forcing the plunger towards the cartridge, and means for retaining the plunger in retracted position in spaced relation to the cartridge, said means including a water soluble element interconnecting the plunger and casing and being effective to release the plunger for movement thereof towards the cartridge under the influence of the spring means when the water soluble element is dissolved by water thereby inflating the balloon and causing it to move out of the casing for floating the casing and the object to which it is attached, said plunger being provided with a recess, a setscrew in the casing with the setscrew having a recess therein for alignment with the recess in the plunger, said water soluble element being in the form of a pellet partially received within the recess in the plunger and partially received within the recess in the setscrew whereby the shear strength of the pellet is employed for locking the plunger to the setscrew and casing for release of the plunger when the water soluble element is dissolved.

3. The combination of claim 2 wherein the end portion of said casing receiving said cartridge is removable for replacing the cartridge, said setscrew being removable for replacement of the water soluble material, said setscrew including an opening extending therethrough for communicating the water soluble element with the exterior of the casing for contact thereof with water when the device is submerged.

4. An inflatable float device for a sinkable object comprising a tubular casing, a stationary cartridge of compressible gaseous material disposed in said casing, a plunger longitudinally slidably in said casing, said plunger being disposed in axial alignment with the cartridge and including a pointed puncture member thereon in facing relation to the cartridge for puncturing the cartridge, said plunger including a passage extending therethrough for communicating with the interior of the cartridge when the cartridge is punctured by the puncture member, an inflatable balloon having a mouth end attached to said plunger in enclosing relation to one end of the passage whereby the compressed gaseous material will inflate the balloon when the cartridge is punctured by the puncture member, a coil spring disposed in the casing with one end engaging the plunger for forcing the plunger towards the cartridge, said coil spring enclosing the balloon when the balloon is uninflated, and a water soluble pellet interconnecting the plunger and the casing for releasably retaining the plunger in retracted position and retaining the spring in compressed condition whereby submersion of the object in water will cause the pellet to dissolve thus releasing the plunger for enabling the spring to drive the plunger and the puncture element towards the cartridge for puncturing the cartridge and inflating the balloon whereby the balloon will be extended, said casing including an opening through which the balloon is extended when inflated thereby floating the object back to the surface of the water, a flexible liner disposed in enclosing relation to the balloon when uninflated and in concentric relation to the coil spring, said liner being disposed against the inner surface of the convolutions of the spring, and a releasable closure member for the opening in the casing for protecting the balloon but being ejected by extension of the balloon when inflated.

5. An inflatable float device for a sinkable object comprising a tubular casing, a cartridge of compressible gaseous material disposed in said casing, a plunger movably mounted in said casing in alignment with the cartridge, said plunger including a pointed puncture member thereon in facing relation to the cartridge for puncturing the cartridge, said plunger including a passage therein for communication with the interior of the cartridge when the pointed puncture member punctures the cartridge, an inflatable balloon having a mouth end connection to said plunger in enclosing relation to one end of the passage whereby the compressed gaseous material will inflate the balloon when the cartridge is punctured by the puncture member, spring means disposed in the casing and engaging the plunger for forcing the plunger towards the cartridge, and water soluble means interconnecting the plunger and the casing for releasably retaining the plunger in retracted position against the bias of the spring means, said water soluble means being rendered ineffective when dissolved by water whereby the plunger under the influence of the spring means will puncture the cartridge thereby inflating the balloon, said casing having an opening to enable the balloon to expand exteriorly thereof for floating the casing and the object to the surface of a body of water, a flexible liner disposed in enclosing relation to the balloon when uninflated thereby protecting the balloon from contact with the spring means and the casing when uninflated, said liner, spring means and balloon being substantially coextensive with each other, and a releasable closure means for the opening in the casing for protecting the balloon and being ejected by the balloon when inflating.

References Cited in the file of this patent

UNITED STATES PATENTS

| | | |
|---|---|---|
| 2,821,725 | Harper | Feb. 4, 1958 |
| 2,853,724 | Smith | Sept. 30, 1958 |
| 2,894,658 | Spidy | July 14, 1959 |
| 2,903,718 | Wright | Sept. 15, 1959 |

FOREIGN PATENTS

| | | |
|---|---|---|
| 485,006 | Canada | July 22, 1952 |
| 552,898 | Canada | Feb. 11, 1958 |